United States Patent
Karadag

(10) Patent No.: US 12,116,292 B2
(45) Date of Patent: Oct. 15, 2024

(54) PLASMA-BASED WATER TREATMENT APPARATUS

(71) Applicant: Burak Karadag, Swindon (GB)

(72) Inventor: Burak Karadag, Swindon (GB)

(73) Assignee: Burak Karadag, Swindon (GB)

( * ) Notice: Subject to any disclaimer, the term of this patent is extended or adjusted under 35 U.S.C. 154(b) by 98 days.

(21) Appl. No.: 17/149,248

(22) Filed: Jan. 14, 2021

(65) Prior Publication Data

US 2021/0221706 A1    Jul. 22, 2021

(51) Int. Cl.
C02F 1/32    (2023.01)
C02F 1/00    (2023.01)
(Continued)

(52) U.S. Cl.
CPC .............. *C02F 1/325* (2013.01); *C02F 1/001* (2013.01); *C02F 1/008* (2013.01); *C02F 1/4608* (2013.01); *H05H 1/247* (2021.05); *H05H 1/46* (2013.01); *C02F 2103/42* (2013.01); *C02F 2201/3228* (2013.01); *C02F 2301/046* (2013.01); *C02F 2301/063* (2013.01); *C02F 2303/04* (2013.01); *C02F 2305/023* (2013.01)

(58) Field of Classification Search
CPC .......... C02F 2305/023; C02F 2301/063; C02F 2303/04; C02F 1/4608; C02F 2201/3228; C02F 1/001; C02F 1/42; C02F 1/325; C02F 1/008; C02F 2103/42; C02F 2301/046; C02F 1/481; C02F 1/484; C02F 2201/4614; C02F 2201/4617; C02F 2201/46175; H05H 1/46; H05H 1/247; H05H 1/24; H05H 1/488; Y02W 10/37
See application file for complete search history.

(56) References Cited

U.S. PATENT DOCUMENTS 6,228,266 B1 * 5/2001 Shim ..................... C02F 1/4608
                                                      210/243
2012/0292262 A1 * 11/2012 Roy .......................... C02F 1/78
                                                      210/192
(Continued)

FOREIGN PATENT DOCUMENTS

CN    1323950 C    7/2007
KR    101882424 B1 *    7/2018    ................ C02F 1/48
(Continued)

OTHER PUBLICATIONS

Njatawidjaja, Decoloration of electrostatically atomized organic dye by the pulsed streamer corona discharge, 2004, Journal of Electrostatics, 63 (2005), pp. 353-359 (Year: 2005).*
(Continued)

*Primary Examiner* — Terry K Cecil

(57) ABSTRACT

The invention relates to a water treatment apparatus based on plasma (ionized gas) discharge. In particular, the invention relates to the field of industrial and agricultural wastewater treatment. More particularly, the invention relates to disinfection of drinking water, and water in pools, spas and similar recreational water environments. The invention comprises a plasma reactor produces plasma discharge at low atmospheric pressure between liquid electrodes eliminating contamination of treated water by harmful nitrogen compounds and toxic substances due to electrode erosion.

15 Claims, 3 Drawing Sheets

Figure 3:
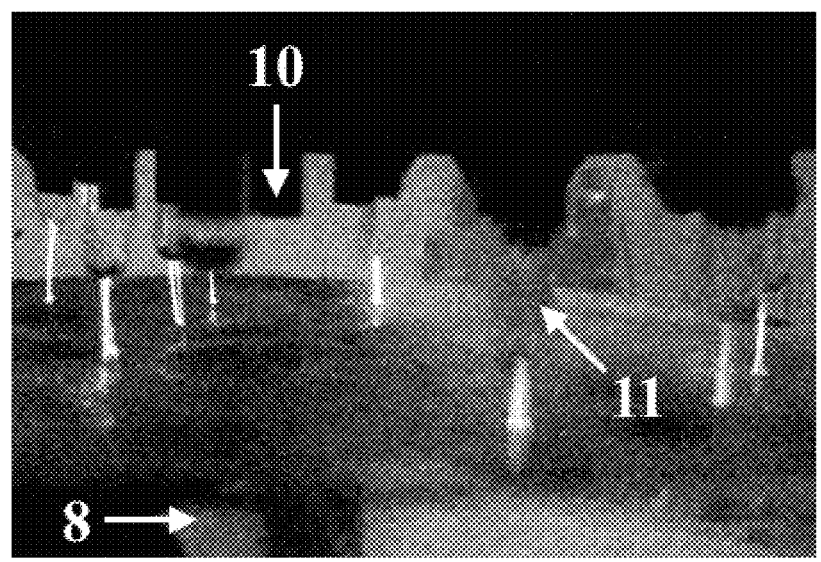

(51) Int. Cl.
  *C02F 1/46* (2023.01)
  *C02F 103/42* (2006.01)
  *H05H 1/24* (2006.01)
  *H05H 1/46* (2006.01)

(56) References Cited

U.S. PATENT DOCUMENTS

2014/0334999 A1* 11/2014 Foret .................... B01J 19/247
  210/748.03
2015/0139853 A1*  5/2015 Zolezzi-Garreton .....................
  C02F 1/4608
  422/186.23
2019/0389745 A1* 12/2019 Schwarz-Kiene ...... C02F 1/325

FOREIGN PATENT DOCUMENTS

| RU | 2729531 C1 * | 8/2020 | |
| WO | WO-02058452 A2 * | 8/2002 | ............ B01J 19/087 |
| WO | WO-2005097213 A1 * | 10/2005 | ............... A61L 2/14 |
| WO | WO 2014/050080 A1 | 4/2014 | |
| WO | WO 2015/164760 A1 | 10/2015 | |
| WO | WO 2016/191696 A1 | 12/2016 | |

OTHER PUBLICATIONS

Machine Translation of WO2005097213 A1, Faust (Year: 2002).*
Plasma Etch, "What is Vacuum Plasma", Feb. 2016 (Year: 2016).*
Pink, Plasma Technology, Aug. 2017 (Year: 2017).*
E A Kral'kina, Low-pressure radio-frequency inductive discharge and possibilities of optimizing inductive plasma sources, 2008, Physics—Uspekhi, 51 (5), pp. 493-512 (Year: 2008) (Year: 2008).*
The Wonders of Physics, "How can you move a plasma?", Sep. 2018 (Year: 2018).*
WO02058452 A2, Zayika, description with line numbers, Aug. 2002 (Year: 2002).*
Machine translation of Kim KR101882424 B1 (Year: 2018).*
Singh, Synthesis of SiC From Rice Husk in a Plasma Reactor, Bull. Mater. Sci., vol. 25, No. 6, Nov. 2002, pp. 561-563. (Year: 2002).*
RU 2729531 C1, English Translation (Year: 2020).*
Gao, Degradation of Dye Wastewater by ns-Pulse DPD Plasma, Plasma Science and Technology, vol. 15, No. 9, Sep. 2013, pp. 928-934 (Year: 2013).*
Wang, Discharge Characteristics of Plasma Induced by Water Drop and Its Potential for Water Treatment, Chemical Engineering Journal 328 (2017) 708-716 (Year: 2017).*
Sun, Characteristics of gas-liquid pulsed discharge plasma reactor and dye decoloration efficiency, Journal of Environmental Sciences, 2012, 24(5) 840-845 (Year: 2012).*
Chanan, Water Treatment Using Plasma Discharge with Variation of Electrode Materials, N Chanan et al 2018 IOP Conf. Ser.: Mater. Sci. Eng. 333 012025 (Year: 2018).*
Randin, Nonmetallic Electrode Materials, Electrochemical Materials Science, Chapter 10, 1981 (Year: 1981).*
Peter J Bruggeman, et al., "Plasma—liquid interactions: a review and roadmap," Plasma Sources Sci. Technol., 2016, vol. 25, No. 5.
Bo Jiang, et al., "Review on electrical discharge plasma technology for wastewater remediation," Chemical Engineering Journal, 2014, vol. 236; pp. 348-368.
Muhammed A Malik, "Water Purification by Plasmas: Which Reactors are Most Energy Efficient?," Plasma Chem Plasma Process, 2010, vol. 10; pp. 21-31.

* cited by examiner

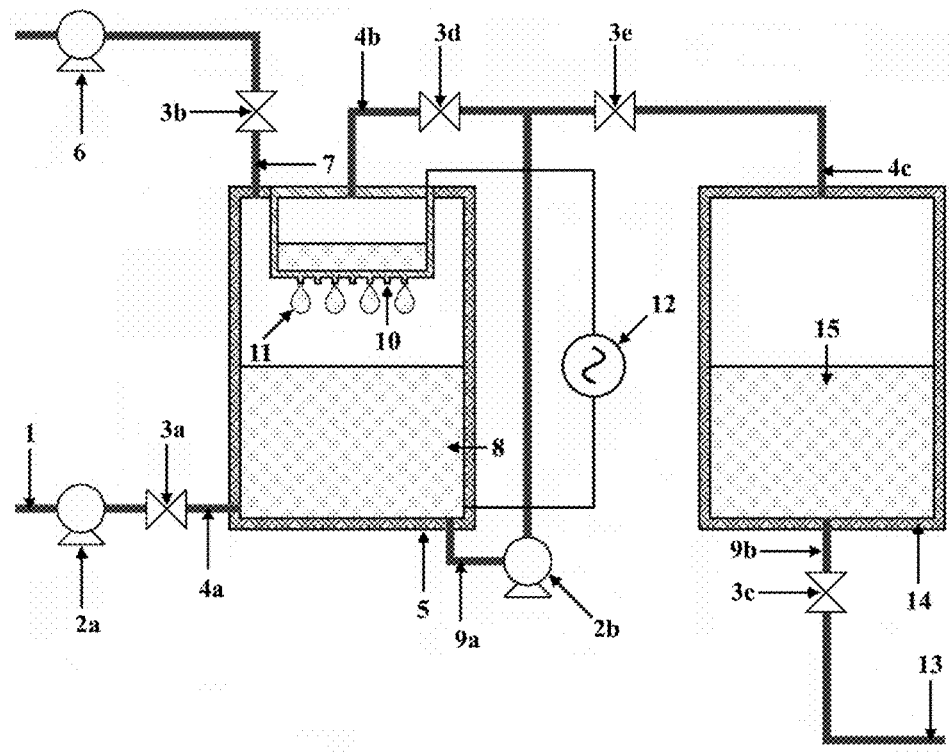
Figure 1
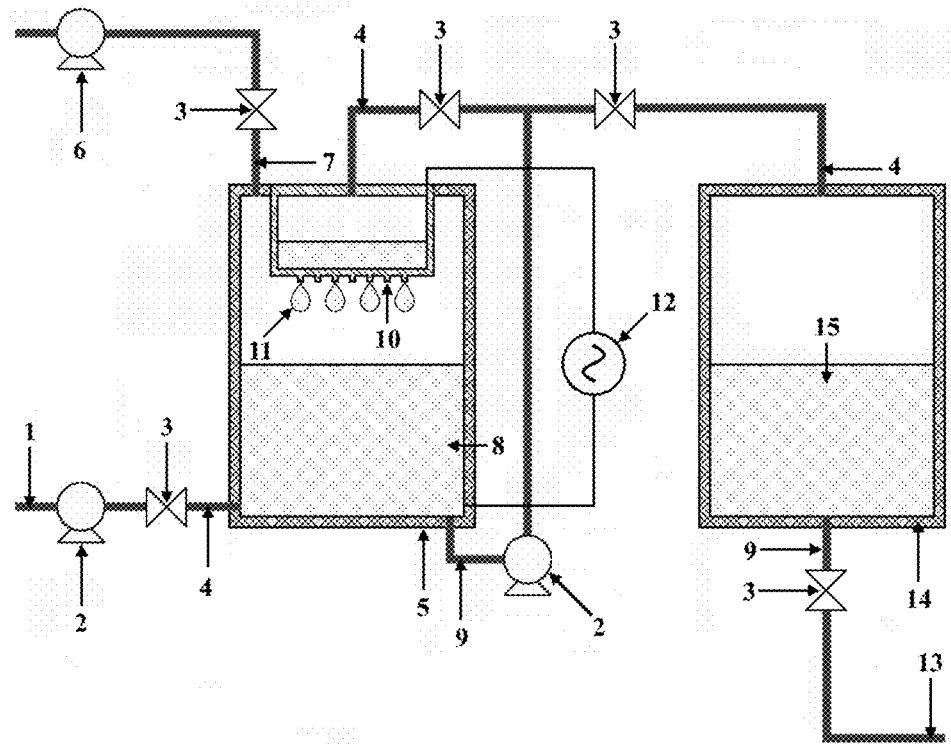

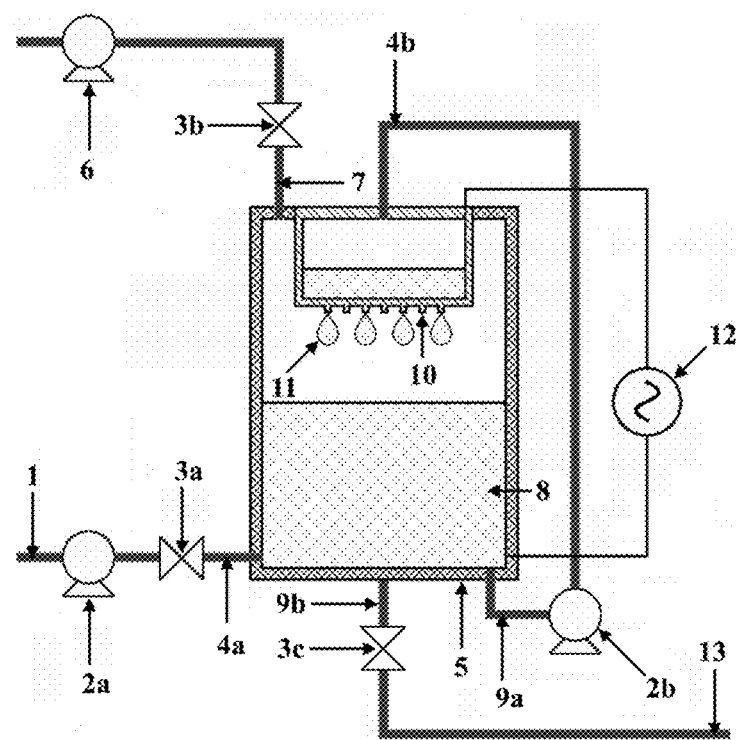
Figure 2
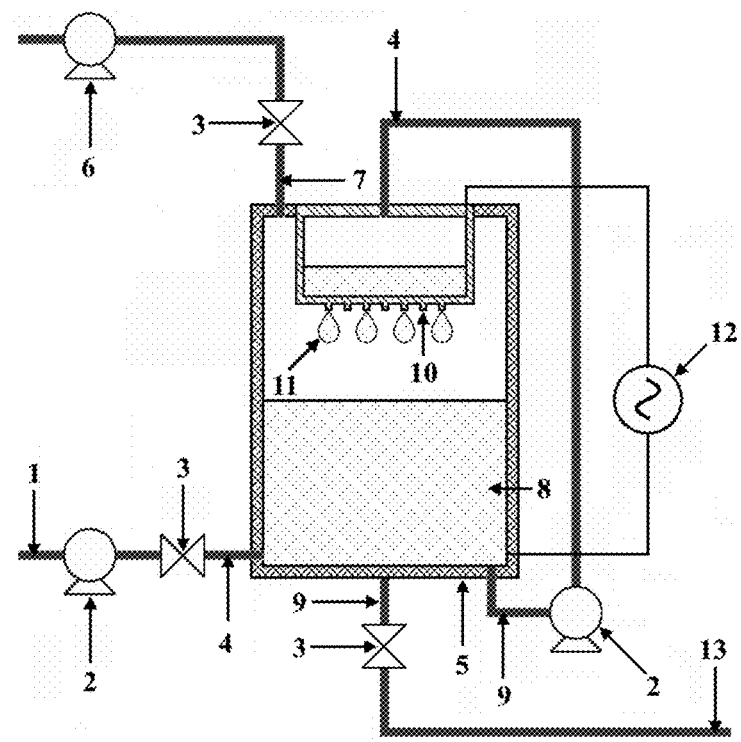

PLASMA-BASED WATER TREATMENT APPARATUS

TECHNICAL FIELD

The present invention relates to a water treatment apparatus based on plasma (ionized gas) discharge. In particular, the invention relates to the field of industrial and agricultural wastewater treatment. More particularly, the invention relates to disinfection of drinking water, and water in pools, spas and similar recreational water environments.

PRIOR ART

Chlorine or chlorine compounds is a water disinfectant, of which strong oxidation properties make it effective against a variety of bacteria, virus and fungus. It is commonly used by municipal water providers and pool operators due to its relatively low-cost and ability provide a residual to prevent pathogen regrowth. However, chlorine is an extremely reactive, corrosive and toxic chemical that can rapidly combine with both inorganic and organic substances. For instance, chlorinated water can accelerate corrosion rate of metal pipes releasing heavy metals into the water supply and putting consumers at risk of poisoning as in the case of Flint water crisis that began in 2014 in the United States. [1] Chlorine can lose its ability to inactivate pathogens by reacting with metals from corroding pipes especially iron to turn into completely different compounds. Besides, chlorine cannot prevent all waterborne diseases because certain pathogens that can cause serious illnesses (e.g. *Cryptosporidium* and *Giardia*) are resistant to the effects of chlorine. In case of pool disinfection, chlorine has a strong odor, and causes allergic reactions in some swimmers. Urine, sweat and skin care products combine with chlorine to form volatile disinfectant byproducts (DBP). Studies have found many health problems related to overexposure to DBPs i.e. frequent swimming including respiratory and reproductive disorders (e.g. asthma and testicular damage). [2][3] The problem is more severe for indoor pools without a good ventilation system. There is a need for a healthy, environment-friendly, low maintenance, safe and inexpensive alternative methods to chlorination.

Alternative water treatment methods to chlorination includes salt water electrolysis, ozone, UV radiation and ionizer systems. Salt water electrolysis is similar to chlorination. The difference is that chlorine itself is produced by electrolysis of common salt dissolved in water. Ozone and UV radiation systems help reduce the amount of chemicals that needs to be added to water, but they cannot be used standalone as they do not have a residual effect. Ozone is also a toxic gas requiring proper handling and storing. UV treatment is effective for treating high-clarity water because contaminants reduce the transmission of UV light. Light intensity of UV lamps reduces significantly after continuous use, and materials in the treated water e.g. minerals may also deposit on the UV light glass tube in time limiting the passage of light. Performance of an UV system should be therefore monitored regularly. As for ionizer systems, they release metal ions (e.g. copper or silver) to the water to inhibit growth of bacteria or algae. Although ionizers have a residual effect in the water, they cannot fastly and adequately neutralize pathogens that is some residual disinfectant like chlorine is still needed.

Current wastewater and drinking-water treatment processes relies primarily on filtering and disinfection, and they are not designed specifically to remove organic chemical contaminants such as pharmaceuticals and phenolic compounds. As a result, traces of a range of soluble contaminants may be found in the tap of the end user. Advanced wastewater treatment processes such as reverse osmosis and advanced oxidation processes (AOPs) can achieve comparatively higher removal rates for the organic contaminants.

AOPs rely on in-situ production of reactive oxygen species (ROS), especially the short lived but highly reactive hydroxyl radical (OH). The OH radical can oxidize almost any compound present in the water, and convert them into small inorganic molecules. Nevertheless, AOPs is energy intensive and highly costly as expensive chemical reagents such as hydrogen peroxide or ozone should be provided continuously to maintain the operation of most AOP systems.

In recent years, atmospheric pressure non-thermal plasmas (ionized gas) in contact with liquids have received a lot of attention for water disinfection and decontamination because advanced oxidation products can be produced in situ in liquid water. When a plasma discharge is placed in contact with water, it "activates" water simultaneously generating physical elements and chemical radicals such as reactive oxygen and nitrogen species (ROS and RNS), ozone, ultraviolet radiation, metal ions, shock waves/ultrasound and solvated electrons the individual and synergetic effects of which inactivate pathogens in the absence of any chlorine without adverse health effects of chlorine and disinfectant byproducts. The presence of the in situ produced advanced oxidants such as the hydroxyl radical, ozone, superoxide, peroxide and singlet oxygen not only degrade soluble chemicals such as textile dye, but also bacteria, protozoa and viruses. Pathogens cannot become immune to plasma treatment as the advance oxidation disrupts cell membranes and denatures lipid-protein complexes. In fact, plasma activated water (PAW) been proven to be an effective broad-spectrum biocidal agent. Previous research has demonstrated the efficacy of plasma discharges for water disinfection and decontamination. [4] For example, Zhang et al. [5] showed that liver-damaging toxins produced blue-green algae in water can be degraded by plasma. These toxins are not addressed by conventional water treatment systems. Dors et al. [6] showed that *Escherichia coli* in river water could be sterilized using plasma. Plasma can break down pharmaceuticals, synthetic dyes and personal care products in drinking water as well.

Plasma-based water disinfection is environment friendly due to operation exclusively on air, water and electricity. Water may be disinfected without any synthetic chemical addition, so there is no need to handle and store toxic chemicals such as hydrogen peroxide or liquid oxygen and associated infrastructure for ozonization methods. It has the ability to provide long-term residual effect, and kill or neutralize the pathogens that can survive in chlorinated water. A plasma-based system may provide a robust, low-maintenance and low-cost solution.

WO 02/058452 describes a device for plasma-chemical treatment of fluid in a medium of an electrical glow discharge, comprising a reaction chamber with means to provide vacuum development in the reactor.

JP2001507274A describes a method and an apparatus for treating an aqueous solution by generating a pulsed electric field between two electrodes in the aqueous solution.

CN1323950C discloses a pulsed plasma gas-liquid discharge device for wastewater treatment, which comprises an aeration chamber and needle electrodes.

WO 2016/191696 describes a plasma water purifier reactor having packed bed discharges employing water streams as dielectric barriers.

U.S. Pat. No. 6,228,266 describes a water treatment plasma reactor having packed bed discharges employing a plurality of beads as dielectric barriers.

WO 2015/164760 describes a system and method for treating flowing water systems with a plasma discharge and ozone to remove or control growth of microbiological species.

Prior art has not been able to make plasma treatment economically feasible compared to existing technologies. Translation of plasma technology from the laboratory to the industry i.e. scale up remains a major challenge as plasma treatment has low treatment volume and high treatment cost. Development of energy efficient high throughput plasma reactor i.e. treatment of large-volume water is thus an active area of research.

Aims of the Invention and Brief Description

Today, 2 billion people lack access to safe drinking water and hundreds of thousands of children under 5 years of age due to poor sanitation and contaminated water. [7] Plasma, the fourth state of matter, can provide a natural solution to this long-standing problem. Plasma-based water treatment process is the enabling technology for small-scale, on-demand and decentralized disinfection, and has the advantage of integration with renewable energy, making the process sustainable.

It is therefore the main objective of the present invention to provide an apparatus for decentralized water treatment in order to overcome the above-mentioned drawbacks of chlorination and available alternative disinfection methods.

An energy efficient high throughput mobile apparatus is provided that treats or activates water with non-thermal plasma to improve quality of drinking water and reduce the reliance on resource and capital-intensive water treatment plants and associated high-cost distribution networks.

The plasma reactor (5) produces plasma discharge between upper and lower liquid electrodes (10, 15), which eliminates the very fundamental component of plasma reactors, metal electrodes preventing toxic metal contamination of treated water due to electrode erosion and reducing maintenance costs.

The upper liquid electrode (15) of the plasma reactor (17) consists of multiple liquid droplets providing relatively larger area of gas-liquid interface for improved absorption rate of discharge by products.

Recirculation of the water flow in the plasma reactor (5) leads to substantially improved diffusion rate of reactive oxygen and nitrogen species (ROS and RNS) from the gas phase to the liquid phase due to increased interaction between plasma discharges and liquid water, enables proper mixing and uniform treatment of the water volume, and increases plasma liquid contact surface area, and thus treatment volume.

The apparatus uses a vacuum pump (6) to remove air from the plasma reactor (5), so that plasma discharge can occur at sub atmospheric pressure, that is in partial vacuum, not to produce aqueous nitrogen oxides (NOx) at harmful levels.

A slow but continuous treatment routine is adopted. The apparatus may include an electronic control unit to control and monitor vacuum pump, liquid pumps, power supply and concentration of oxygen-containing and nitrogen-containing compounds generated in the plasma reactor.

DEFINITION OF THE FIGURES OF THE INVENTION

Features of the present invention may be better understood with reference to the drawings described below. The drawings are not necessarily to scale; emphasis instead generally being placed upon illustrating the principles of the invention.

FIG. 1: schematically shows a plasma reactor with liquid electrodes, vacuum pump, liquid pump, liquid inlet, liquid outlet, gas inlet and outlet, power supply, according to one embodiment of the invention.

FIG. 2: shows a plasma reactor with liquid electrodes, vacuum pump, liquid pump, liquid inlet, liquid outlet, gas inlet and outlet, power supply, liquid reservoir according to one embodiment of the invention.

FIG. 3: An image of plasma discharge filaments formed between electrodes.

DEFINITIONS OF THE PARTS/ASPECTS/SECTIONS FORMING THE INVENTION

1: Water Source
2a: Liquid Pump
2b: Liquid Pump
3a: Valve
3b: Valve
3c: Valve
3d: Valve
3e: Valve
4a: Liquid Inlet Port
4b: Liquid Inlet Port
4c: Liquid Inlet Port
5: Plasma Reactor
6: Vacuum Pump
7: Gas Outlet Port
8: Lower Liquid Electrode
9a: Liquid Outlet Port
9b: Liquid Outlet Port
10: Droplet Generator
11: Upper Liquid Electrode
12: Power Supply
13: Conduit
14: Liquid Reservoir
15: Plasma Treated Water

DETAILED DESCRIPTION OF THE INVENTION

An apparatus for plasma-based water treatment and plasma activated water production, comprising;
 a) A plasma reactor (5) to form reactive oxygen species (ROS) such as hydroxyl radical, hydrogen peroxide and ozone.
 b) A liquid reservoir (14) to rest plasma treated water in the plasma reactor (5) until long lived reactive oxygen species degraded into per se non-reactive substances.

A preferred embodiment of the present invention may be understood with reference to FIG. 1. A liquid pump (2a) takes liquid water from a water source (1), and delivers it to a plasma reactor (5).

Plasma reactor (5) comprises a liquid pump (2b), which recirculates a liquid flow in a recirculation pathway between a liquid outlet port (9a) and a liquid inlet port (4b); a liquid outlet port (9b) to remove liquid water; a liquid inlet port (4b) to supply liquid water to the droplet generator; a vacuum pump (6) to remove air molecule through a gas outlet port (7); an electrically conductive lower liquid electrode (8) and an electrically conductive upper liquid electrode (11) to provide electric field for ionization of water in liquid and vapour phases; a liquid drop or droplet generator

(10) to generate water droplets, where the liquid drop or droplets serve as the upper liquid electrode (11); a high voltage high frequency AC power supply (26), which biases said electrodes. Lower liquid electrode (8) is liquid water treated and treated in plasma reactor (5).

As shown in FIG. 1 and FIG. 2, plasma reactor comprises a housing with an interior space that has the liquid drop or droplet generator positioned at an upper end; and a reservoir for water to accumulate at the lower end.

A vacuum pump (6) removes air molecules and other gases in plasma reactor (5) and lower liquid electrode (8) to the atmosphere. As pressure decreases in plasma reactor (5), lower liquid electrode (8) begins to boil at room temperature removing dissolved air in the liquid water. The resulting water vapour replaces the air molecules and other gases. The vacuum pump (6) and the vacuum tight structure of the plasma reactor (5) ensure subatmospheric pressure to keep amount of harmful nitrogen oxides (NOx) to be formed due to plasma discharge below recommended thresholds.

Due to application of a strong electric field between the upper and lower liquid electrodes (8,11), water vapors molecules are ionized, and decomposed into the constituent atoms to form reactive oxygen species and advanced oxidants such as the hydroxyl radical, superoxide, singlet oxygen and hydrogen peroxide. Electrical breakdown of liquid water and water vapour in plasma reactor (5) due to strong electric field in the gap between the two electrode surfaces develop luminous plasma discharge filaments produce reactive oxygen species (ROS). The plasma discharge filaments in the plasma reactor (5) extinguish and regenerate continuously as the existing water drops fall to surface of the lower liquid electrode (8), and the droplet generator (10) creates new water drop/droplets with gravitational pull on them.

The plasma discharge filaments "activate" liquid water (8), and lead to generation of shock waves/ultrasound and solvated electrons. Plasma activated water (PAW) is produced merely by the use of air, water and electricity, and it is an effective broad-spectrum biocidal agent.

The electric field causes water vapour particles to be ionised, and these particles subsequently emit photons of ultra-violet light when excited by the electric field, where the UV photons subsequently treat the water. The individual and synergetic effects of these chemical and physical processes inactivate pathogens and breakdown organic and inorganic contaminants.

The plasma treated water (8) is transferred to a liquid reservoir (14) to rest the treated water in the plasma reactor (5) until long lived reactive oxygen species degraded into per se non-reactive substances e.g. hydrogen peroxide tends to decompose slowly by itself into water and oxygen, and enable the plasma reactor treat a new batch of liquid water. The liquid pump (2b) is connected to the liquid inlet port (4c) and the liquid reservoir (14) through a pair of valves (3d and 3e). When it is desired to transfer water from the plasma reactor (5) to the liquid reservoir (14) through a liquid inlet port (4c), one valve opens, while the other one closes.

A liquid outlet port (9b), which is controlled by a valve (3c), connect the liquid reservoir (14) to a conduit (13) to deliver plasma treated water (15).

Liquid water that the liquid pump (2b) takes from the water source (1) may be passed through a liquid filter, which is not shown, for removal of suspended solid particles in water, and to prevent the drop/droplet generator tips from clogging depending on the water clarity.

One can modify induced plasma chemistry e.g. concentration of ROS the plasma reactor (5) by tailoring water vapour/air pressure, treatment time, voltage, current, frequency or duty cycle of the high voltage high frequency power supplies (12) and water treatment time. Electrical energy to drive the apparatus may be obtained from mains, portable electric generators or renewable sources such as solar panels and wind turbines.

The apparatus is placed in a sheet metal cabinet, which is not shown, to shield electromagnetic interference radiation. An electronic control unit, which is not shown, is used to automate, oversee and regulate operation of the power supply, pumps and valves.

Electrodes of the plasma reactor (8, 11) are connected to at least one power supply which is selected from group of high voltage high frequency alternating current (AC) supply, high voltage direct current (DC) power supply, pulsed AC power supply, pulsed DC power supply, high voltage nanosecond pulsed power supply, or any combination thereof, to provide electric field for ionization of gases in the plasma reactor.

In one embodiment of the invention, the plasma reactor (5) may be used standalone without the liquid reservoir (14) as shown in FIG. 2.

In one embodiment, the plasma reactor (5) may include a mist maker, preferably ultrasonic mist maker in order to enhance generation of reactive species by spraying water mist into plasma discharge region.

In one embodiment, the plasma reactor (5) may include probes and sensors to measure a number of parameters such as pressure, temperature, pH, electrical conductivity, oxidation reduction potential and nitrates.

In one embodiment, a plurality of the plasma reactor (5) can be connected in series or parallel to increase amount of the treated water volume or to decrease the required time for treatment.

In one embodiment, the plasma reactor (5) may include a water-loaded microwave antenna, which is not shown, driven by a microwave power supply to produce microwave plasma discharge. Electromagnetic waves may be coupled to the cavity of the plasma reactor (5) at resonant frequency to form standing waves.

In one embodiment, the plasma reactor (5) may include permanent magnets or electromagnetic coils to generate radially extending magnetic field lines that are parallel to surface of the lower electrode (8) or axially extending magnetic field lines that are perpendicular to surface of the electrode (8) to obtain electron cyclotron resonance (ECR) microwave-based plasma discharge.

In one embodiment, the plasma reactor (5) may include ultraviolet (UV) reflective coating to intensify plasma generated UV radiation and its absorption by water in liquid and gas phases.

An embodiment of the invention has been successfully tested. A multiple number of plasma discharge filaments form between the two electrode surfaces (8, 11) as shown in FIG. 3. An acid red 337 (AR 337) dye solution prepared from tap water was used to illustrate the ability of the present invention to degrade dye concentration. Spectrophotometer measurements showed that concentration of AR 337 dye reduces from its initial value of 20 mg/L to 1 mg/L, corresponding to a decolorization efficiency of %95. Dye decolorization/degradation result suggests that the invention is capable of decomposing organic contaminants present in potable and non-potable water.

The apparatus may be integrated into a water dispenser relating to home appliance. It may be used in tandem with conventional water filters such as reverse osmosis and alkaline water filters in order to compensate for disadvantages of these filters.

The apparatus may be scaled as a portable water purifier for outdoor activities. It may be scaled up to treat wastewater from textile industry or wastewater discharged from all hospital activities. It should be appreciated that application of the invention is not limited to these examples.

REFERENCES

[1] Pieper, K. J., Tang, M., Edwards, M. A., 2017. Flint water crisis caused by interrupted corrosion control: Investigating "ground zero" home. Environ. Sci. Technol. 51, 2007-2014.
[2] Richardson, S. D., Plewa, M. J., Wagner, E. D., Schoeny, R., DeMarini, D. M., 2007. Occurrence, genotoxicity, and carcinogenicity of regulated and emerging disinfection by-products in drinking water: a review and roadmap for research. Mutat. Res/Rev. Mutat. 636 (1e3), 178e242.
[3] Villanueva C. M., Cordier S., Font-Ribera L., Salas L. A., Levallois P. Overview of disinfection by-products and associated health effects. Curr. Environ. Health Rep. 2015; 2:107-115. doi: 10.1007/s40572-014-0032-x.
[4] Foster, J. E. Plasma-based water purification: Challenges and prospects for the future. Phys. Plasmas 2017, 24 (5), 055501.
[5] H. Zhang, Q. Huang, Z. Ke, L. Yang, X. Wang, and Z. Yu, Water Res. 46, 6554 (2012).
[6] M. Dors, E. Metel, J. Mizeraczyk, and E. Marott, "Pulsed corona discharge in water for *coli* bacteria inactivation," in Proceedings of the IEEE International Conference on Dielectric Liquids, 30 Jun.-3 Jul. 2008 (2008).
[7] "Progress on drinking water, sanitation and hygiene: 2017 update and SDG baselines", UNICEF, WHO.

What is claimed is:

1. A plasma reactor, comprising:
    a liquid pump, which recirculates a liquid flow between a first liquid outlet port and a first liquid inlet port, wherein the first liquid inlet port supplies liquid water to a liquid drop or a droplet generator;
    an upper liquid electrode and a lower liquid electrode, the plasma reactor configured for electrical breakdown between said electrodes and plasma gas and liquid phase interactions treating water and producing plasma activated water; and the liquid drop or droplet generator generating water droplets, wherein the water drop or droplets act as the upper liquid electrode;
    a housing defining an interior space having the liquid drop or droplet generator positioned at an upper end; and a reservoir for water to accumulate at the lower end, wherein water in the reservoir acts as the lower liquid electrode, wherein the housing comprises the first liquid inlet port, the first liquid outlet port, and a liquid recirculation pathway connecting between the first liquid outlet port and the first liquid inlet port; and
    a high-voltage power supply connecting to both the upper and lower liquid electrodes to bias the liquid water supplied to the drop or droplet generator and the lower liquid electrode, such that plasma discharge filaments in the plasma reactor extinguish and regenerate continuously as the liquid water drop or droplets fall to the surface of the lower liquid electrode;
    wherein there are no non-liquid electrodes within the interior space connected to the high-voltage power supply, to prevent toxic metal contamination of treated water due to electrode erosion.

2. The plasma reactor according to claim 1, wherein said plasma reactor further comprises a second liquid inlet port which supplies water from a water source by another liquid pump and a second liquid outlet port to remove liquid water.

3. The plasma reactor according to claim 1, wherein the high voltage power supply is selected from the group consisting of high voltage high frequency alternating current (AC) supply, high voltage direct current (DC) power supply, pulsed AC power supply, pulsed DC power supply, high voltage nanosecond pulsed power supply, or any combination thereof, to provide electric field for ionization of gases in the plasma reactor.

4. The plasma reactor according to claim 1, wherein said plasma reactor further comprises a vacuum tight chamber.

5. The plasma reactor according to claim 1, wherein said plasma reactor further comprises a vacuum pump to remove air molecules through a gas outlet port for generating plasma discharge at sub atmospheric pressure or in partial vacuum.

6. The plasma reactor according to claim 1, wherein said plasma reactor further comprises a liquid filter to remove suspended solid particles or turbidity-causing particulate matter in water.

7. The plasma reactor according to claim 1, wherein said plasma reactor further comprises a mist maker to enhance generation of reactive oxygen species.

8. The plasma reactor according to claim 1, wherein said plasma reactor further comprises a control unit.

9. The plasma reactor according to claim 1, wherein said plasma reactor further comprises a liquid reservoir connected downstream from the housing to receive treated water therefrom.

10. The plasma reactor according to claim 1, wherein a plurality of said plasma reactors are connected in parallel or series.

11. The plasma reactor according to claim 1, wherein said plasma reactor further comprises a microwave or radiofrequency antenna driven by an electromagnetic wave generator.

12. The plasma reactor according to claim 1, wherein said plasma reactor further comprises ultraviolet reflective coating.

13. The plasma reactor according to claim 1, wherein said plasma reactor further comprises an ultraviolet light source or a blue light source.

14. The plasma reactor according to claim 1, wherein said plasma reactor further comprises permanent magnets or electromagnetic coils.

15. The plasma reactor according to claim 1, wherein the liquid drop or droplet generator creates liquid water drop or droplets with gravitational pull on them.

* * * * *